US006959413B2

(12) United States Patent
Humlicek et al.

(10) Patent No.: US 6,959,413 B2
(45) Date of Patent: Oct. 25, 2005

(54) METHOD OF HANDLING UNREADABLE BLOCKS DURING REBUILDING OF A RAID DEVICE

(75) Inventors: Donald R. Humlicek, Wichita, KS (US); Charles E. Nichols, Wichita, KS (US); William P. Delaney, Wichita, KS (US)

(73) Assignee: LSI Logic Corporation, Milpitas, CA (US)

(*) Notice: Subject to any disclaimer, the term of this patent is extended or adjusted under 35 U.S.C. 154(b) by 472 days.

(21) Appl. No.: 10/175,234

(22) Filed: Jun. 18, 2002

(65) Prior Publication Data

US 2003/0233611 A1 Dec. 18, 2003

(51) Int. Cl.[7] ........ G06F 11/10

(52) U.S. Cl. ........ 714/807; 714/6; 711/114

(58) Field of Search ........ 714/770, 799, 714/764, 746, 765, 48, 807, 6; 711/114; 719/325

(56) References Cited

U.S. PATENT DOCUMENTS 5,504,858 A 4/1996 Ellis et al.
5,574,855 A 11/1996 Rosich et al.
5,581,690 A 12/1996 Ellis et al.
5,826,001 A * 10/1998 Lubbers et al. ........ 714/6
5,913,927 A * 6/1999 Nagaraj et al. ........ 714/8
5,933,592 A * 8/1999 Lubbers et al. ........ 714/6
6,161,192 A * 12/2000 Lubbers et al. ........ 714/6
6,349,359 B1 2/2002 Gittins et al.
6,629,273 B1 9/2003 Patterson
6,665,773 B1 * 12/2003 McCombs ........ 711/114
2001/0008008 A1 * 7/2001 Mori ........ 711/114
2002/0073279 A1 * 6/2002 Sasamoto et al. ........ 711/114
2003/0233611 A1 12/2003 Humlicek et al.

* cited by examiner

*Primary Examiner*—Guy Lamarre
*Assistant Examiner*—John P. Trimmings
(74) *Attorney, Agent, or Firm*—Cochran, Freund & Young LLC

(57) ABSTRACT

Disclosed is a method for continuing a rebuilding process of a RAID system by flagging a block of data as being bad when a media error or other error occurs that prohibits the reconstruction of data. The block of data may be flagged by writing a bad error correction code to the block of data, by keeping a log of bad blocks of data, or by otherwise indicating that the block of data is known bad.

10 Claims, 8 Drawing Sheets

METHOD OF HANDLING UNREADABLE BLOCKS DURING REBUILDING OF A RAID DEVICE

BACKGROUND OF THE INVENTION a. Field of the Invention

The present invention pertains generally to redundant arrays of independent disks (RAID) and specifically to reconstruction of data on RAID devices.

b. Description of the Background

Redundant arrays of independent disks (RAID) is standardized technology for the storage of data with emphasis on performance, fault tolerance, and the ability to recover data due to a failure of a disk drive. Many RAID products are commercially available.

The RAID Advisory Board of St. Peter, Minn. has defined and standardized several different RAID levels. RAID level 1 ('RAID 1'), for example, is a mirrored disk wherein a complete copy of the data on one disk is simultaneously maintained and stored on a second disk. In the event of a failure of one disk, a complete copy of the data on the second disk is available. The data on the second disk may be used to recreate the data on the first disk when the first disk is replaced or repaired. RAID 5 uses several disks to store data. The data is stored in stripes, meaning that for a large block of data, some will be written to the first drive, some to the second drive, and so forth. Several disks can write in parallel, thus increasing the data throughput by a multiple of the number of available disks. RAID 5 uses parity as a method to store redundancy information. Parity is computed by performing the exclusive OR (XOR) function to the data on each block of the stripe. Other RAID levels exist with different variations of performance and cost tradeoffs.

FIG. 1 illustrates the concept of creating parity in the RAID 5 standard. The data blocks 102, 104, 106, and 108 are a single stripe. The data blocks are combined using the XOR function to calculate the parity. In the present illustration, the parity 110 is stored on drive 2. Parity can be used to reconstruct data that is lost on any one drive.

FIG. 2 illustrates the placement of data and parity across the various disk drives in the RAID 5 standard when there are five drives in the array. The drives 202, 204, 206, 208, and 210 are shown in columns while the individual stripes are shown in rows such as 212 and 214. For the first stripe 212, the data 216, 218, 220, and 222 are written onto drives 0–3 and the parity 224 to drive 4. For the second stripe 214, the data 226, 228, 230, and 232 are written to drives 0, 1, 2, and 4 and the parity 234 to drive 3. In this manner, the parity is equally divided amongst all of the drives. In some RAID levels, a dedicated disk is allocated to storing the parity.

FIG. 3 illustrates how data can be reconstructed when one of the disk drives fails in a RAID 5 system. In the present illustration, drive 4 has failed, leaving the data 302 unreadable. The data 312 can be reconstructed by combining the remaining data 304, 306, and 310 with the parity 308 using the XOR function.

If any one drive fails in a system, the data contained on the failed drive can be reconstructed. When the data from the failed drive is requested, the XOR function of the data on the stripe will be used to reconstruct the requested data. This can be done on the fly. When the system is operating in such a state, it is classified as a degraded state. The system can operate in a degraded state until another drive fails, at which time the system is dead. When two drives fail, the parity and the remaining drives are not sufficient to reconstruct the missing data and the system halts.

When the drive fails and is replaced, the system will rebuild the data onto the replaced drive using the XOR function. The rebuilding process is to take the data and parity from the other drives, reconstruct the data block using the XOR function, and write the reconstructed data onto the new disk. When the rebuilding process is completed, the fully populated RAID system will return to a fully operational or 'optimal' state.

It is not unusual for a drive to have a failure in a single block of data such as with a media error. In a fully operational RAID 5 system, the failure of a single block of data would be reconstructed and the system would function as normal. However, if a single block of data has failed in an otherwise good drive during a rebuilding process, a failure will occur and the rebuild process will typically halt, leaving the system in a degraded state. The rebuild process cannot continue at that point, as there is insufficient data to fully rebuild the replaced drive.

If two blocks of data in a single stripe have failed, such as with a media error on the individual blocks of data, the remaining blocks of data in the stripe are still valid data. However, the blocks of the failed drives have data that are permanently lost. During a read operation, the RAID system can typically return an error message in place of the lost data without halting operation.

It would therefore be advantageous to provide a method for continuing a rebuilding process when a single failed block is encountered.

SUMMARY OF THE INVENTION

The present invention overcomes the disadvantages and limitations of the prior art by providing a method of continuing with a reconstruction operation when more than one data block is not available and thus allowing the operation of the RAID system to continue. Such a method would make the remaining data on the RAID system still available while ensuring that bad or corrupt data is not sent.

The present invention may therefore comprise a method of handling an error during the rebuilding of a replaced disk in a RAID system comprising: selecting a block of data to rebuild on the replaced disk; reading data from the existing disks in the RAID system; encountering an error when reading one of the existing disks; determining that the block of data to rebuild cannot be computed based on the error; flagging the block of data as bad; and processing said block of data as a bad block during subsequent read operations of said block of data.

The present invention may further comprise a RAID system capable of handling an error during a rebuild process comprising: a plurality of storage disks; and a controller, said controller being capable of storing data on said plurality of storage disks in accordance with a RAID standard, said controller being further capable of detecting an error during the read operation of good disks during rebuilding such that the data on a rebuilding drive cannot be recreated, said controller being further capable of flagging said block of data as bad such that said block of data is treated as a bad block during subsequent read operations of said block of data.

The advantages of the present invention are that the rebuilding of a replaced or repaired drive of a RAID system may continue in the event of a media failure or other abnormality. The lost data associated with the media failure or abnormality is contained and the system is prevented from sending corrupt data for subsequent read commands. The method of continuing with the rebuilding process may use a process of marking a block on the rebuilt drive with a known bad error correction code, error detection code, or cyclic redundancy check. This method may allow the normal RAID algorithms to handle subsequent read commands without change.

DETAILED DESCRIPTION OF THE INVENTION

Figure 1:
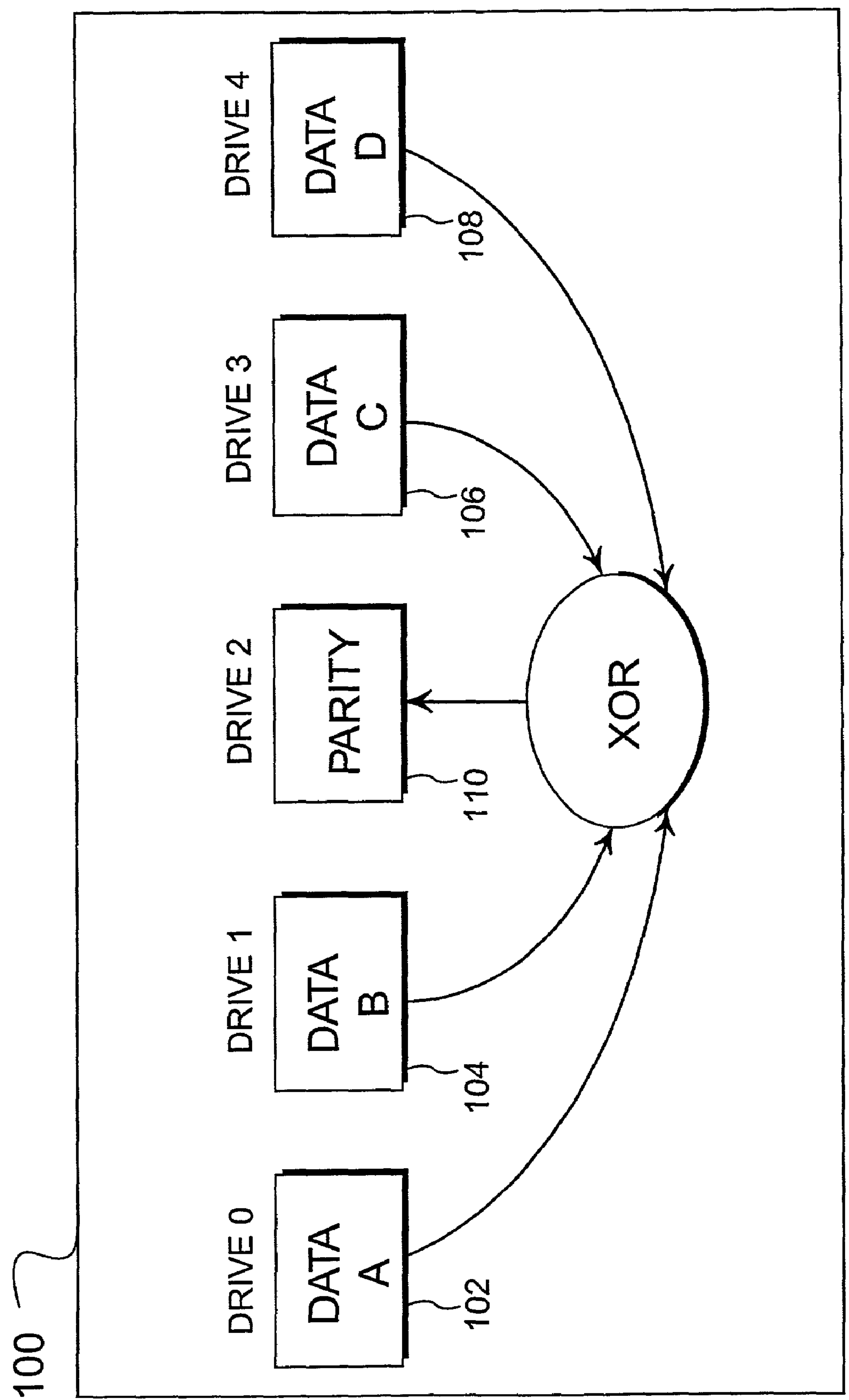
FIG. 1 is an illustration of the concept of creating parity in the RAID 5 standard.
Figure 2:
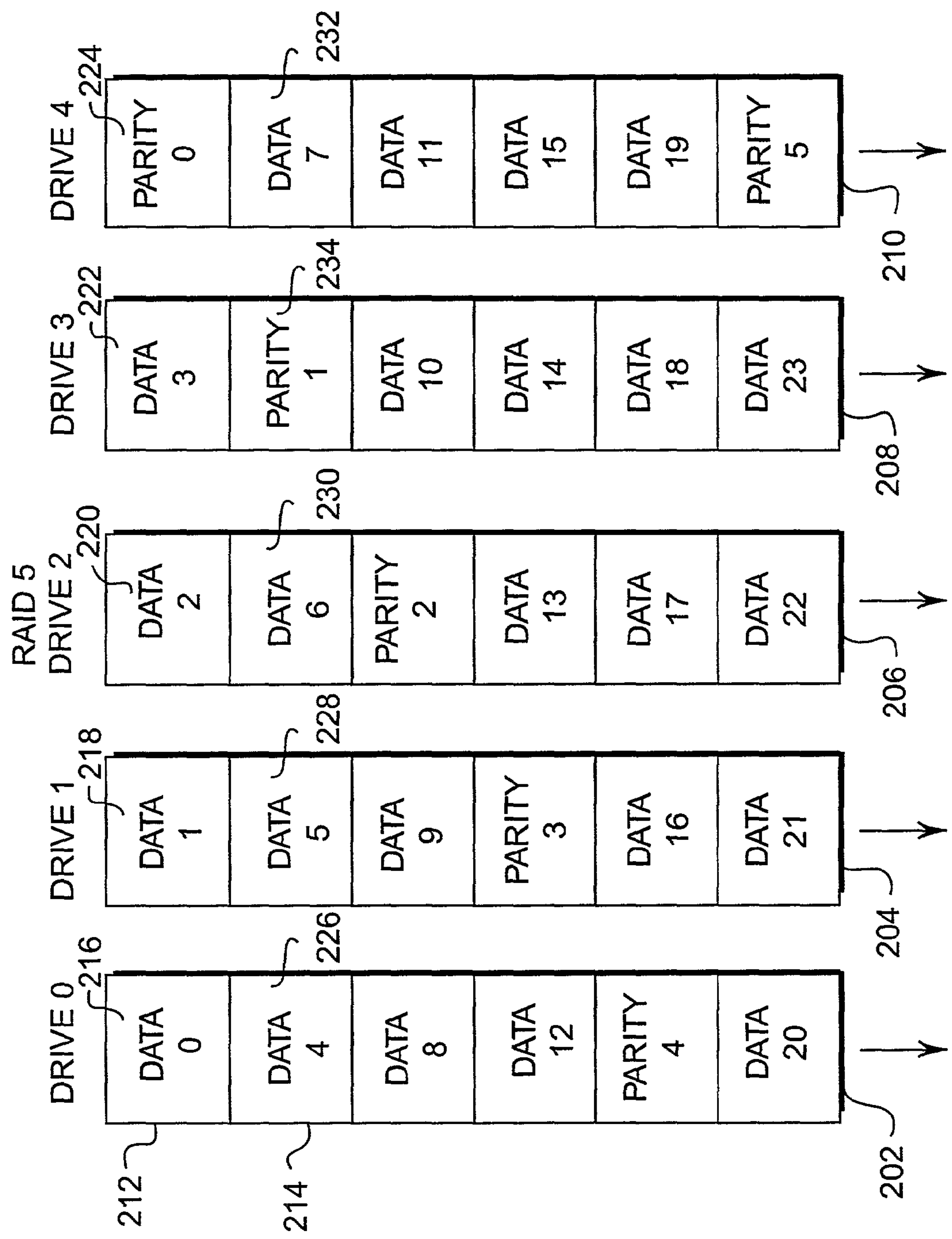
FIG. 2 is an illustration of the placement of data and parity across the various disk drives in the RAID 5 standard with five drives in the array.
Figure 3:
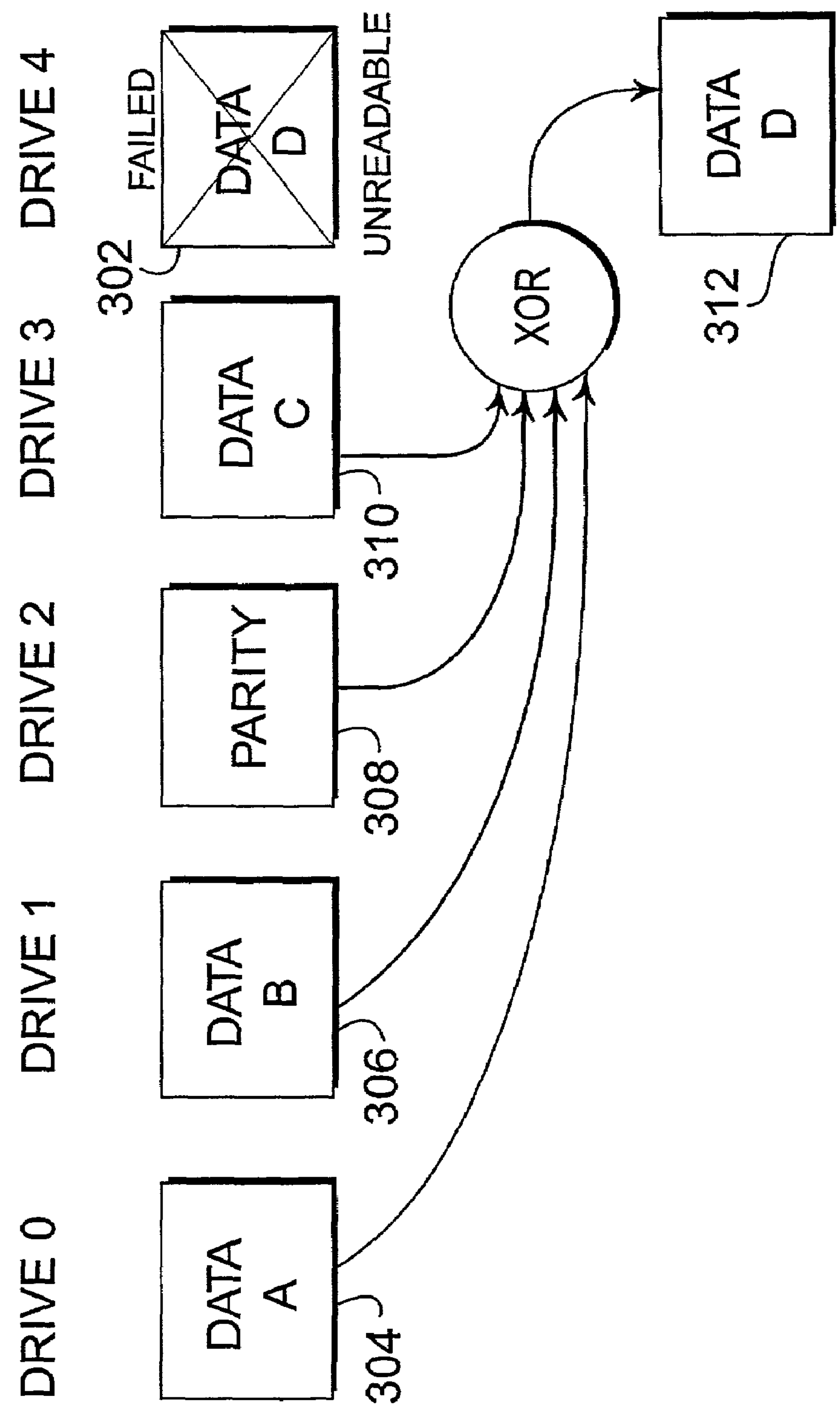
FIG. 3 is an illustration of how data can be reconstructed when one of the disk drives fails in a RAID 5 system.
Figure 4:
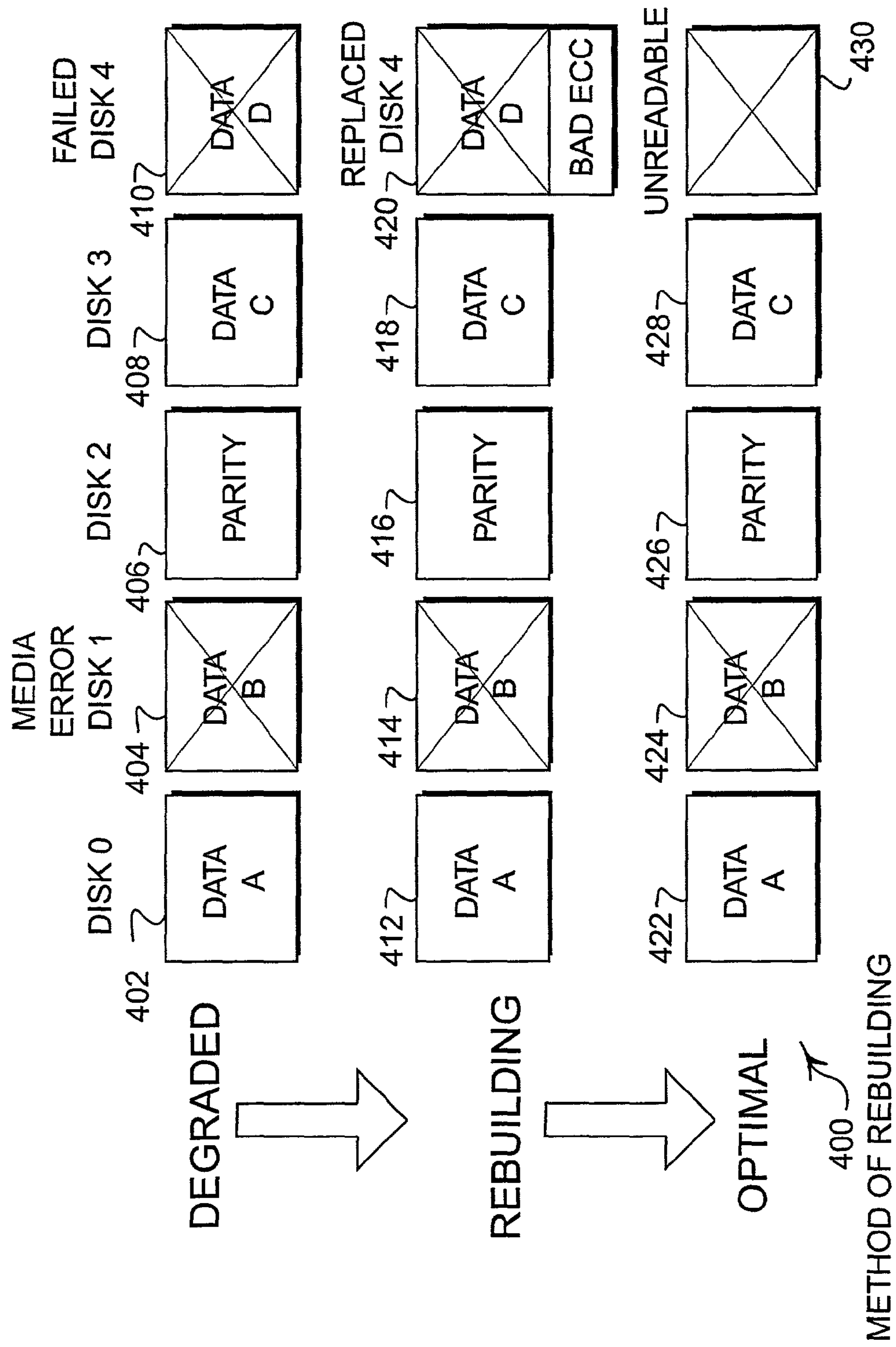
FIG. 4 is an illustration of an embodiment of the present invention wherein a media error is encountered in a rebuilding process.

FIG. 4 illustrates an embodiment 400 of the present invention wherein a media error is encountered in a rebuilding process. When a drive has failed and is replaced, if a media error or other local problem precludes the reconstruction of a stripe of data, the block on the reconstructed drive is marked as bad and rebuilding can continue. Because of the media error, the XOR function cannot be completed and thus a data loss will have occurred.

Blocks 402, 404, 406, 408, and 410 represent a stripe of a five-disk RAID 5 system in degraded mode. Block 402 represents the data from disk 0. Block 404 represents the data from disk 1 wherein a media error prohibits access to the data. Block 406 represents the parity data. Block 408 represents the data from disk 3, and block 410 represents data on the failed disk 4.

Blocks 412, 414, 416, 418, and 420 represent the same stripe as above during the rebuilding process. Because block 414 of disk 1 has a media error, the data for the rebuilding of drive 4 cannot be constructed. In the prior art of rebuilding a RAID device, the controller may halt the rebuild process due to the media error in block 414. If the controller were to continue, any data placed onto the block 420 would be corrupt because the data of block 414 were known bad.

The inventive procedure is to flag the data on the replaced drive as bad and continue with the rebuild process. In the inventive process, block 420 is treated as bad data even though that portion of the disk operates correctly.

Typical RAID devices may use Small Computer Standard Interface ('SCSI') of various forms to interface to the individual disk drives. SCSI standards allow for a built-in error correction code ('ECC') to check data during read and write operations. In general, the data is stored with an ECC to verify data integrity. The data and ECC are compared after a normal read operation and verified. If an inconsistency between the data and ECC occurs, the SCSI disk drive will return an error such as a media fault.

In one embodiment of the inventive procedure, block 420 could be flagged as a bad block of data by intentionally writing a recognizable data pattern with an ECC that is inconsistent with the data pattern. Such a write operation may be accomplished with the SCSI Write Long command, wherein the data and ECC may be separately written. In this manner, subsequent reads to block 420 will be read, analyzed, compared to the ECC, and return an error code consistent with a media fault. The controller would then process the read operation using normal RAID procedures. The present embodiment takes advantage of existing error handling procedures of the controller during subsequent read operations.

In another embodiment of the inventive procedure, a table of blocks may be kept wherein block 420 would be flagged as bad. Blocks may be compared against the table to determine if known problems exist. Flagged blocks would be ignored and normal error handling procedures would be followed.

The blocks 422, 424, 426, 428, and 430 represent the same data stripe as above but placed into optimal operation mode after the rebuild process has occurred. The data of blocks 422, and 428 remain readable, as does the parity block 426. The data of block 424 remains unreadable due to a media error and block 430 has been written with a bad ECC such that block 430 appears to the controller as a media error.

In the inventive process, the data of blocks 422 and 428 remain readable but may be susceptible to data loss because the data of blocks 422 and 428 cannot be rebuilt from the data on the remaining drives. One of the advantages of the present invention is that all of the available data can be used when the RAID system returns to optimal mode. The data from the failed drive cannot be recreated due to an error on another drive resulting in some data loss. However, the data that exists are still made available by returning the system to an optimal state even though an error occurred during reconstruction. If the system were never returned to optimal mode, a much more substantial data loss would occur because the replaced drive would have never been reconstructed.

Figure 5:
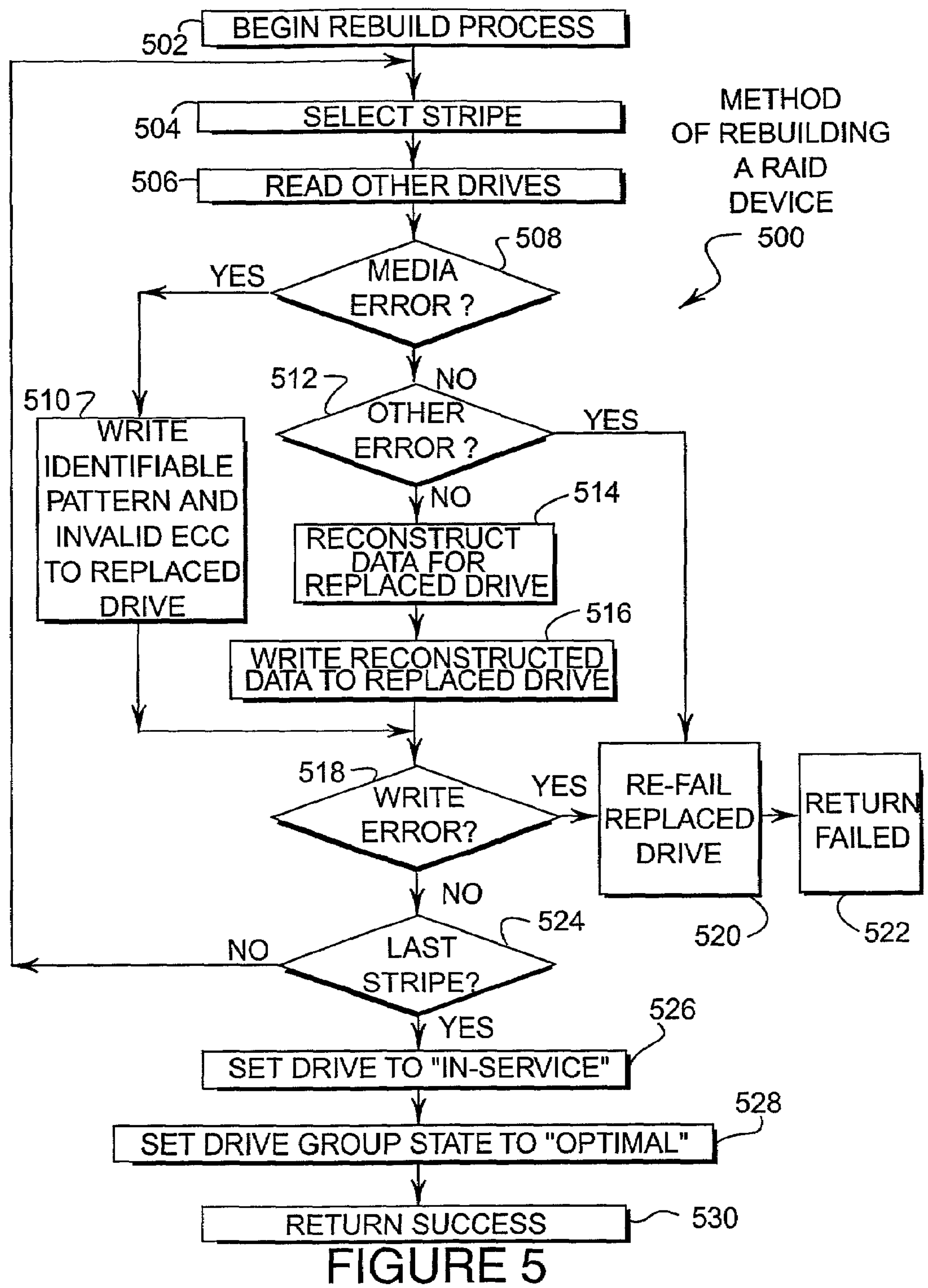
FIG. 5 is a work process diagram of an embodiment of the present invention of a method of reconstructing a RAID device when media errors occur.

FIG. 5 is a work process diagram of the inventive method 500 of reconstructing a RAID device when media errors occur. The rebuilding process begins in block 502. A stripe is selected in block 504 and the available disks are read in block 506. If a media error occurs in block 508, an identifiable pattern with an invalid ECC is written to the reconstructed disk for this stripe in block 510. If no other error occurs in block 512, the data is reconstructed in block 514 and written to the disk in block 516. If a write error occurs in block 518, the replaced drive is re-failed in block 520 and the process is halted and returned as failed in block 522. If the write is successful, and another stripe is available in block 524, the process is repeated. When no more stripes are available, the replaced and reconstructed drive is set to 'in-service' in block 526, after which the drive group can be set to 'optimal' in block 528 and the process can be returned successful in block 530.

The block 510 forces the reconstructed drive to return a media error if a read is requested even though the media is correctly functioning. This prevents bad data from being used by a computer system, since it is generally preferred to return an error code than it is to unknowingly return corrupted data. The error code will prohibit reconstruction of data within the stripe if another drive is replaced, adding to the data loss. However, the complete RAID system will continue to be in service.

In some alternative embodiments, the RAID system controller may maintain its own cyclic redundancy check ('CRC') or error detection code ('EDC') for the data. In such embodiments, the block 510 may include writing an invalid CRC or EDC to the disk, resulting in an error when the data is read at a later time and the saved CRC or EDC is found to differ from the computed CRC or EDC, respectively.

RAID 5 offers one level of fault tolerance, meaning that one failure of several disks can be tolerated. The reconstruction of any one missing piece of data can be performed and the system can be brought back to a normal operating state. If two faults occur, such as a drive is replaced and a media error occurs on another drive, RAID 5 has exceeded its fault tolerance and some data will be lost. The present invention allows the system to identify the lost data and yet return to a fully functioning state.

Those skilled in the art will appreciate that the method 500 is applicable to all RAID levels wherein a drive may be replaced and rebuilt. That is, all RAID levels except RAID 0.

Figure 6:
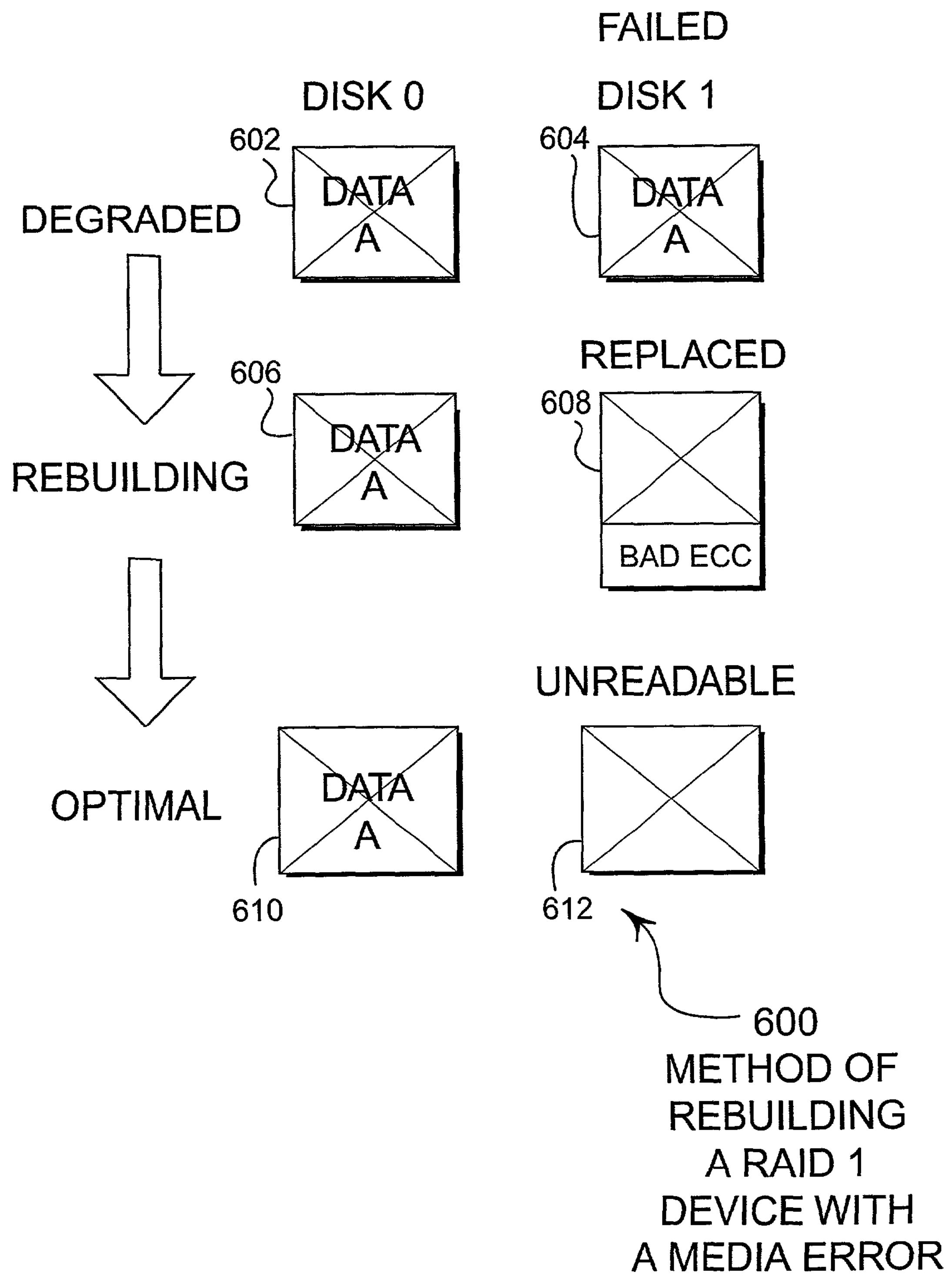
FIG. 6 is an illustration of an embodiment of the present invention of the rebuilding of a RAID 1 device with a media error in the drive that is not replaced.

FIG. 6 is an illustration of the rebuilding of a RAID 1 device with a media error in the drive that is not replaced. Block 602 represents the data of drive 0 that has encountered a media error. Block 604 represents the data of drive 1 wherein drive 1 has failed. The blocks 602 and 604 represent a RAID 1 system in a degraded state, when only drive 0 is available.

Blocks 606 and 608 represent the data blocks 602 and 604 during the process of rebuilding. The block 608 cannot be rebuilt from the data of block 606 because of a media error in block 606, therefore a known bad ECC or other method is used to indicate that the rebuilt block 608 contains invalid data. The blocks 610 and 612 represent the data blocks 606 and 608 when the system is returned to the optimal state. In this case, the data from block 606 is permanently lost due to two simultaneous failures: the failed disk drive 1 and the media error of block 606 of disk drive 0.

Figure 7:
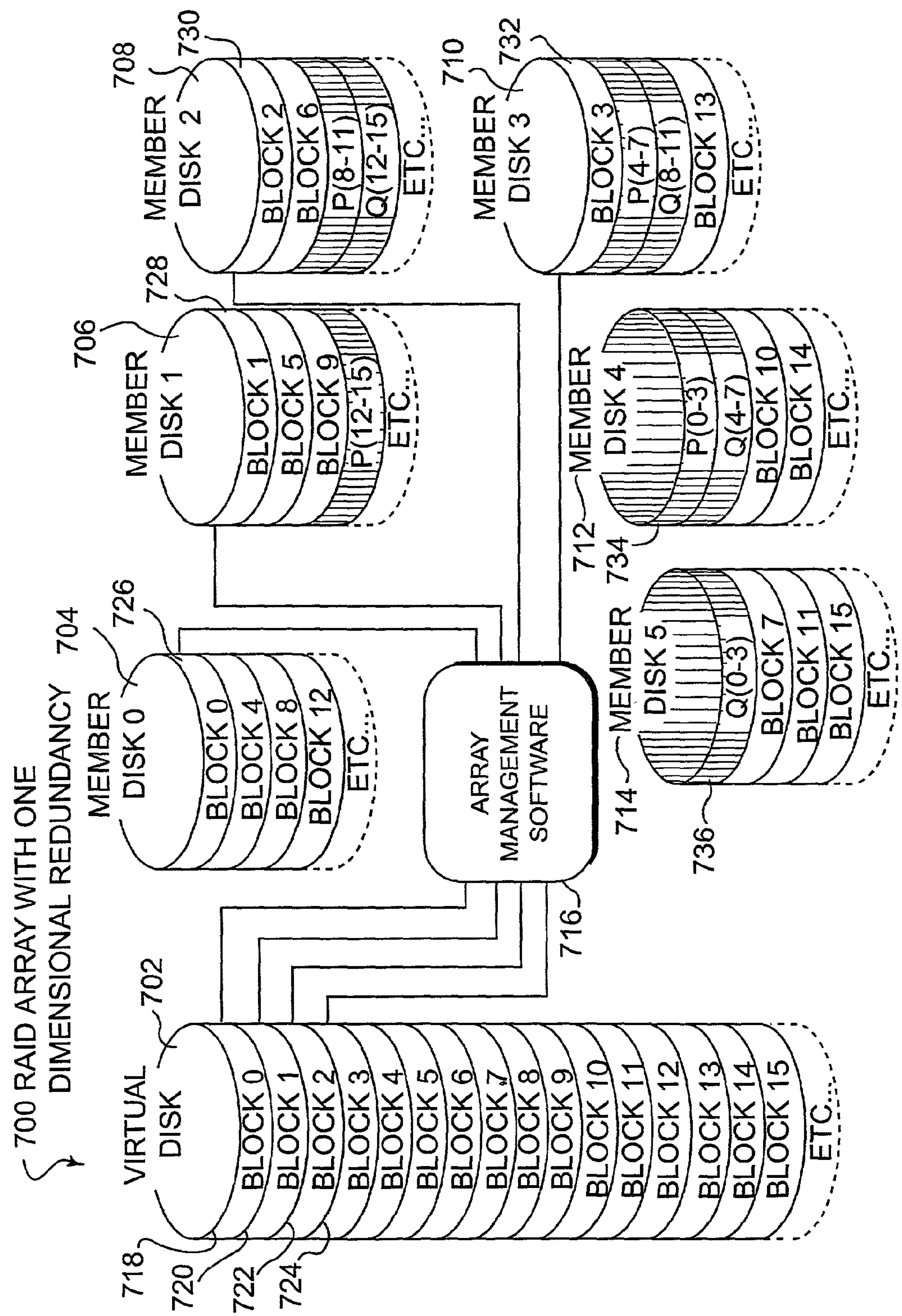
FIG. 7 is an illustration of a RAID 6 array with one-dimensional redundancy.

FIG. 7 is an illustration of a RAID 6 array with one-dimensional redundancy. RAID 6 incorporates two parity computations and writes for each disk write. The RAID system presents itself to other computers as a virtual disk 702 but is composed of individual member disks 704, 706, 708, 710, 712, and 714. A RAID controller operating array management software 716 performs all of the control functions. The four blocks 718, 720, 722, and 724 of the virtual disk 702 are mapped to blocks 726, 728, 730, and 732 of the various disks. The blocks 734 and 736 represent two different calculated parities for the data of the other four data blocks.

The embodiment 700 of a RAID 6 system is capable of tolerating two simultaneous failures. For example, if any two of the disks were to fail or become unavailable, the data of the two missing disks can be recreated using normal RAID 6 procedures. Should a third failure occur during a rebuilding process, such as a media error in one of the remaining drives, data loss will have occurred and the system would return failed. Using the inventive method, the two reconstructed blocks may be written with a known bad ECC, CRC, or EDC to ensure that the blocks will be treated by the controller 716 as unusable data. This process ensures that the RAID system can be returned to an optimum state and corrupt data will not be used.

Figure 8:
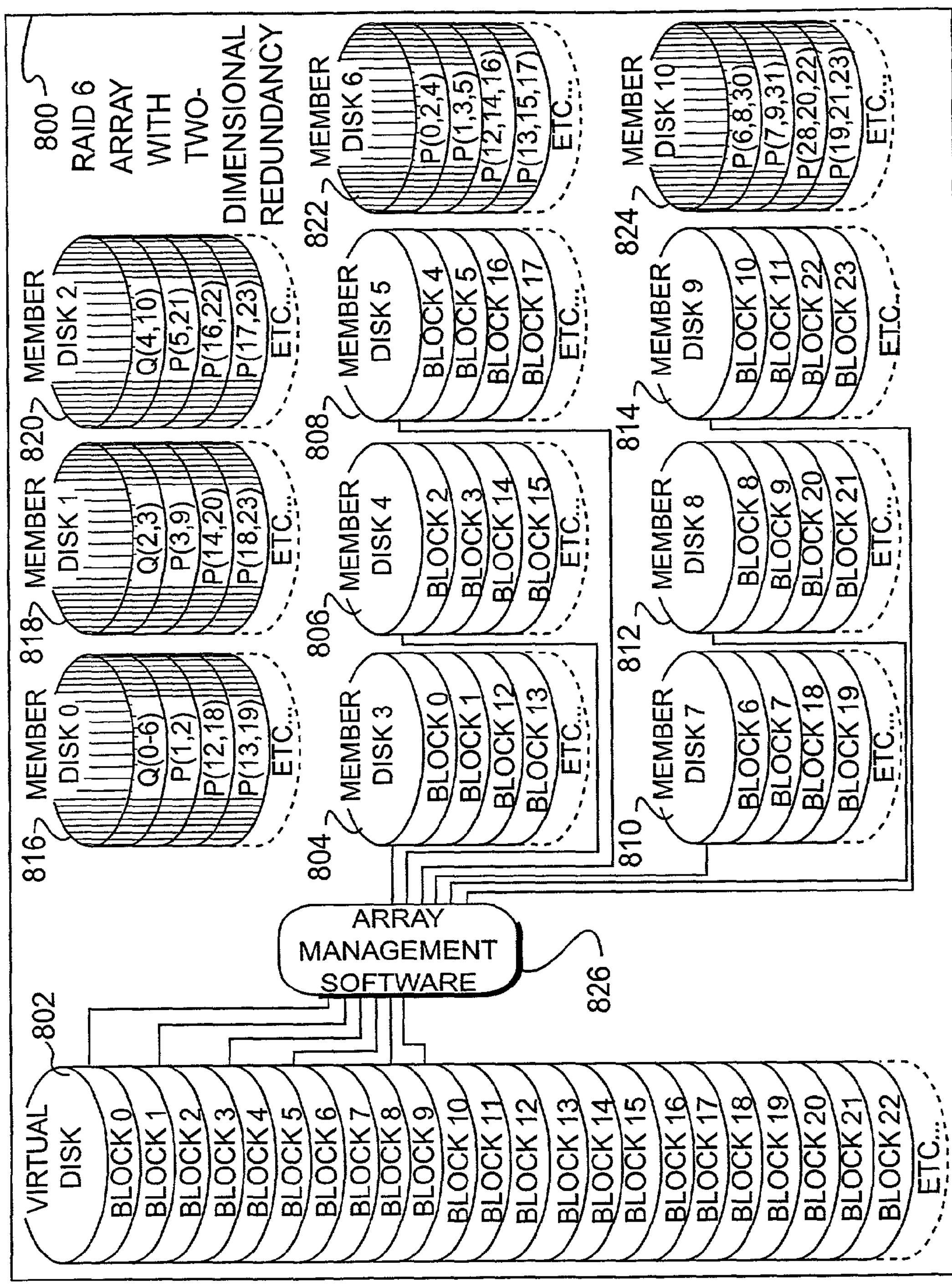
FIG. 8 is an illustration of a RAID 6 array with two-dimensional redundancy.

FIG. 8 represents a RAID 6 array with two dimensional redundancy. The virtual disk 802 is mapped to data disks 804, 806, 808, 810, 812, and 814. Disk 816 contains the parity calculated from the column of disks 804 and 810. Likewise, disks 818 and 820 contain the parity of the columns of the remaining data disks. Disks 822 and 824 contain the parity of the respective rows of data disks.

The system 800 has the ability to recover from at least two simultaneous failures of any disk. For example, the simultaneous failure of disks 804 and 806 can be recovered by using the parity disks of the member columns. In the case of a failure of disks 804, 806, and 812, the disk 812 can be reconstructed from the data of the lower row, and then the remaining disks can be recovered from their respective columns.

There are cases where additional failures in the form of media errors would prohibit proper reconstruction, such as if disks 804 and 806 failed but simultaneous media errors occurred on disks 810 and 812 during reconstruction, prohibiting reconstruction to continue. In such a case, the inventive process of marking the replaced disks with a bad ECC, CRC, EDC, or other flagging mechanisms may allow a rebuild to continue while prohibiting known bad data from being sent.

The foregoing description of the invention has been presented for purposes of illustration and description. It is not intended to be exhaustive or to limit the invention to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A method of handling an error during the rebuilding of a replaced disk in a RAID system comprising:

selecting a block of data to rebuild on said replaced disk;

reading data from the existing disks in said RAID system;

encountering an error when reading one of said existing disks;

determining that said block of data to rebuild cannot be computed based on said error;

flagging said block of data as bad by writing a new set of data in said block of data during the course of rebuilding data on said replaced disk, said new set of data comprising a readable pattern of data and an invalidity code associated with said readable pattern of data indicating that said readable pattern of data is bad data; and processing said block of data as a bad block during subsequent read operations of said block of data as a result of detecting said invalidity code.

2. The method of claim 1 wherein said flagging of said block of data as bad comprises writing said new set of data comprising said readable pattern of data and an invalid error correction code to said replaced disk.

3. The method of claim 1 wherein said flagging of said block of data as bad comprises writing said new set of data comprising said readable pattern of data and an invalid cyclic redundancy code to said replaced disk.

4. The method of claim 1 wherein said flagging of said block of data as bad comprises writing said new set of data comprising said readable pattern of data and an invalid error detection code to said replaced disk.

5. The method of claim 1 wherein said error comprises a media error.

6. A RAID system capable of handling an error during a rebuild process comprising:

a plurality of storage disks; and a controller, said controller being configured for storing data on said plurality of storage disks in accordance with a RAID standard, said controller being further configured for detecting an error for a block of data during a read operation of good disks during rebuilding of a failed disk, said controller being further configured for flagging said block of data as bad by writing a new set of data in said block of data during the course of rebuilding data on a replacement disk, said new pattern of data comprising a readable pattern of data and an invalidity code associated with said readable pattern of data indicating that said readable pattern of data is bad data such that said block of data is treated as a bad block during subsequent read operations of said block of data as a result of detecting said invalidity code.

7. The system of claim 6 wherein said controller flags said block of data as bad by writing said new pattern of data comprising said readable pattern of data and an invalid error correction code to said replaced disk.

8. The system of claim 6 wherein said controller flags said block of data as bad by writing said new pattern of data comprising said readable pattern of data and an invalid cyclic redundancy code to said replaced disk.

9. The system of claim 6 wherein said controller flags said block of data as bad by writing said new pattern of data comprising said readable pattern of data and an invalid error detection code to said replaced disk.

10. The system of claim 6 wherein said error comprises a media error.

* * * * *